United States Patent [19]

Okada et al.

[11] 4,423,445
[45] Dec. 27, 1983

[54] CLUTCH SYSTEM IN A TAPE PLAYER

[75] Inventors: Hitoshi Okada; Kazuki Takai; Katsumi Yamaguchi, all of Toda, Japan

[73] Assignee: Clarion Co., Ltd., Tokyo, Japan

[21] Appl. No.: 259,745

[22] Filed: May 1, 1981

[30] Foreign Application Priority Data

May 2, 1980 [JP] Japan .............................. 55-59858[U]

[51] Int. Cl.³ .......................................... G11B 5/008
[52] U.S. Cl. ............................................... 360/96.5
[58] Field of Search ................ 360/96.5, 96.6, 85, 360/83, 96.4, 92; 242/197-200, 191

[56] References Cited

U.S. PATENT DOCUMENTS 4,012,787  3/1977  Van Slageren ..................... 360/85
4,152,738  5/1979  Shimizu et al. ..................... 360/95
4,227,224  10/1980 Umezawa et al. ............... 360/96.5
4,337,487  6/1982  Takai ........................... 360/96.5 X Primary Examiner—Alfred H. Eddleman
Assistant Examiner—K. Wong
Attorney, Agent, or Firm—Flynn, Thiel, Boutell & Tanis

[57] ABSTRACT

A clutch system in a tape player comprises a first rotor rotated by a motor and a second rotor capable of engaging with and disengaging from said first rotor, both rotors being formed with engage portions at their end faces which are adjacent to each other. The clutch system is further provided with a switching means for carrying out engagement and disengagement of said rotors, and the switching means is operated by an operating means for making said motor carry out automatic loading operation.

8 Claims, 15 Drawing Figures

CLUTCH SYSTEM IN A TAPE PLAYER

FIELD OF THE INVENTION

This invention relates to a clutch system in a tape player, and more specifically to a system suitable for a tape player in which an automatic loading operation is carried out by means of a driving means which is provided for driving the tape.

BACKGROUND OF THE INVENTION

It is largely advantageous to carry out the automatic loading operation by utilizing a motor provided for driving the tape of the tape player, because it makes operation of the tape player more smooth and it is possible to use the existent driving means having a single motor.

However, on adopting such a structure, a clutch system has to be provided for switching the linkage between an automatic loading means and the driving system.

That is, although there is no need to operate the automatic loading means during the drive of the tape, if the loading means is continuously connected to the driving means, a respectable amount of energy should be wasted in driving the loading means.

Therefore, it is necessary to detach the automatic loading means from the driving means during play time of the tape in order to secure a stable operation of the tape player. Furthermore, the detachment of the automatic loading means has to be timely done.

SUMMARY OF THE INVENTION

In accordance with the present invention, under the circumstances as mentioned above, there is provided a clutch system in a tape player which comprises: a first rotor rotated by a motor; a second rotor capable of engaging with and disengaging from said first rotor; both rotors being formed with engage portions at their end faces which are adjacent to each other; a switching means for carrying out the engagement and disengagement of said rotors; and said switching means being operated by an operating means for making said motor carry out the automatic loading operation.

BRIEF DESCRIPTION OF THE DRAWINGS

The drawings represent the preferred embodiments according to the present invention, in which.

DESCRIPTION OF THE PREFERRED EMBODIMENTS

Figure 1:
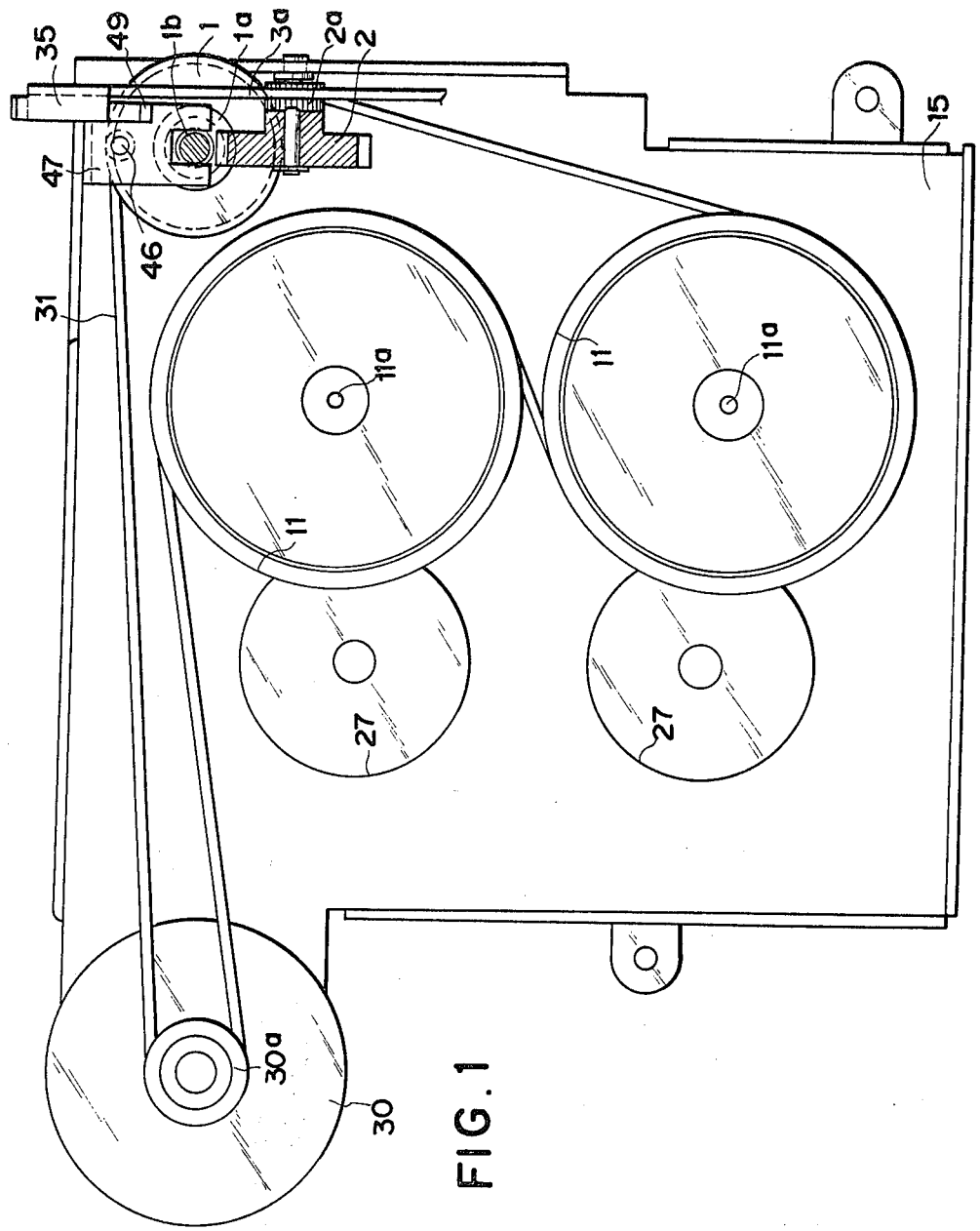
FIG. 1 is a partially sectioned bottom view of a tape player provided with a clutch system according to the present invention.

The present invention will now be described in detail, referring to the preferred embodiments as illustrated in the drawings.

A motor 30 (FIG. 1) is mounted on an end portion of a deck 15. A pulley 30a of the motor 30 is wound up with a belt 31 which extends winding through a plurality of flywheels 11, 11 disposed on the deck 15.

In order to properly rotate these flywheels 11 by means of the single belt 31, an intermediate rotor 1 is mounted on an end portion of the deck 15. Thus, by making the belt 31 travel through the intermediate rotor 1, engagement of the belt 31 with both flywheels 11, 11 over a preferable circumferential extent can be obtained, and incidentally a travelling course is formed in which the belt 31 does not contact with itself.

In this invention, the intermediate rotor 1 is adopted as a structure for carrying out the prescribed automatic loading operation. For this purpose, an engage rotor 1a is supported on a common axle 41 with the intermediate rotor 1. The engage rotor 1a engages with a linkage rotor 2 and a gear portion 2a integrally formed with the linkage rotor 2 engages with a rack portion 3a of a rack element 3. In this embodiment, the rack element 3 enables automatic loading operation as described later.

Figure 7:
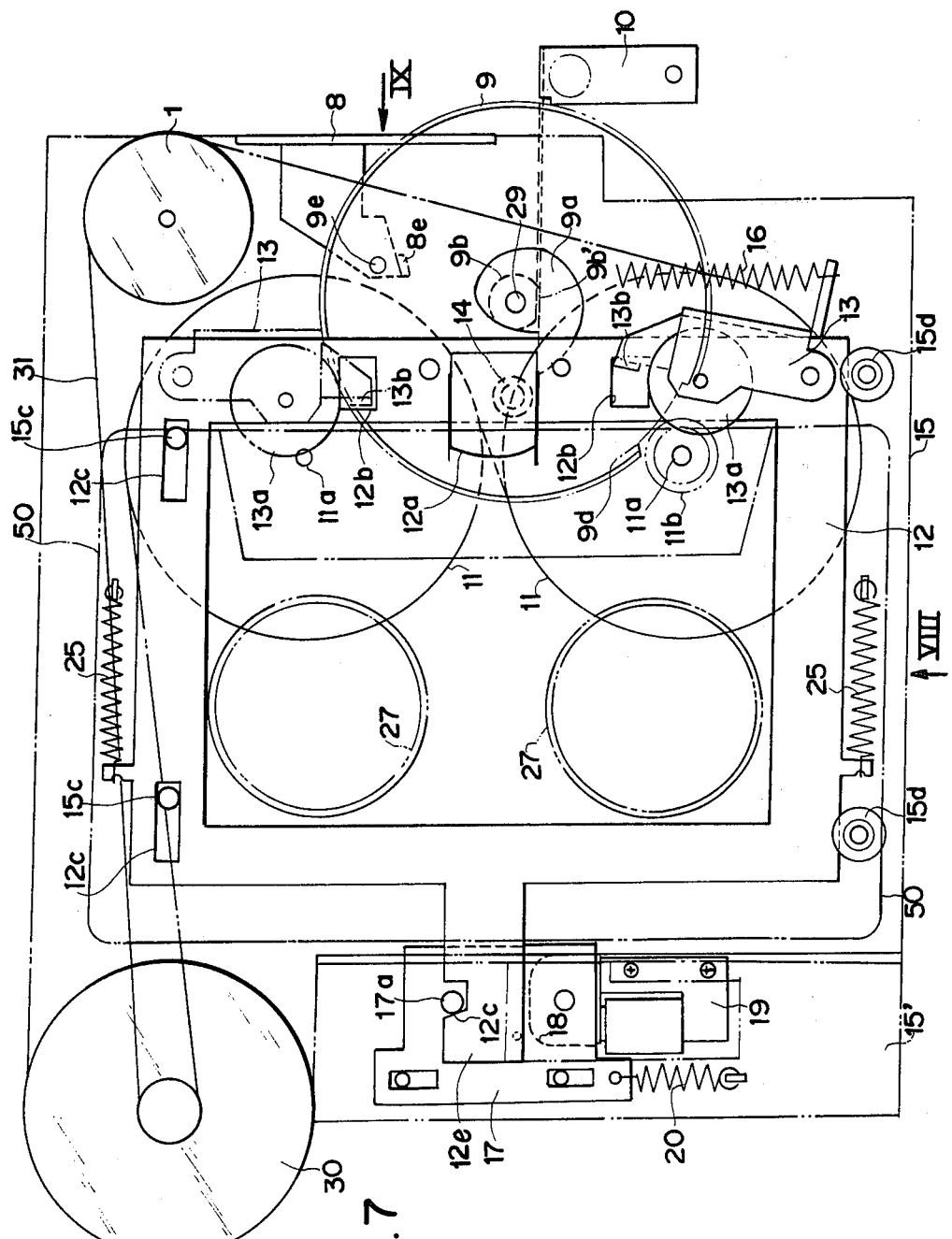
FIG. 7 is a bottom view of the tape player having an automatic loading structure according to the present invention.

In order to switch automatic loading operation by the rack element 3 and operation for playing tape, the rack element 3 is arranged to go ahead upon insertion of a tape pack 50 (FIG. 7).

That is, the rack element 3 is formed with a cam actuating portion 35 in a front end portion thereof. The cam actuating portion 35 engages a cam portion 49 of a lift or switching member 47 which is slidably mounted on a guide bar 46 provided in the deck 15 in parallel with the axis 41 of the engage rotor 1a and the intermediate rotor 1. Between the lift member 47 and the deck 15 is interposed a spring 48, and a portion 47b of the lift member 47 is received in a groove 1b of the engage rotor 1a.

The intermediate rotor 1, slidably mounted on the support axis 41, is formed with an engage face 1c in the lower end thereof to thereby engage with or disengage from an intermediary member 1d mounted on the support axle 41.

With this arrangement, when the cam actuating portion 35 of the rack element 3 acts on the cam portion 49 of the lift member 47 to thereby push the lift member 47 and the engage rotor 1a downwardly, the engage rotor 1a engages at its engage face 1c with the intermediary member 1d to thereby rotate integrally with the intermediate rotor 1.

Figure 2:
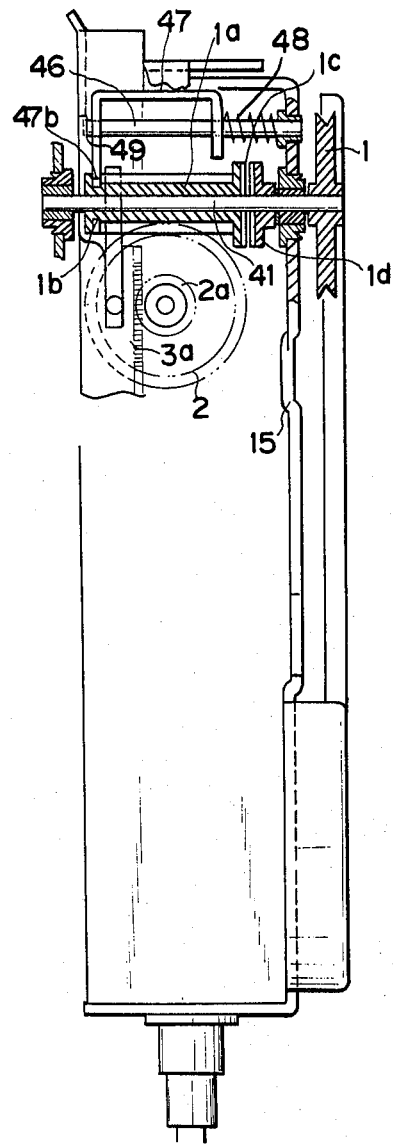
FIG. 2 shows a longitudinal sectional view of the essential parts of FIG. 1.

Accordingly, when the rack element 3 is sufficiently pushed to render the cam portion 49 free from pressure from the cam actuating portion 35, the lift member 47 and the engage rotor 1a are lifted by the spring force of the spring 48, as shown in FIG. 2, to thereby detach the engage face from the intermediary member 1d, and thus the integral rotation of the engage rotor 1a with the intermediate rotor 1 is interrupted.

Figure 3A:
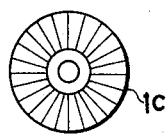
FIG. 3A and FIG. 3B are each an explanation drawing of engagement portions of the clutch system.
Figure 3B:
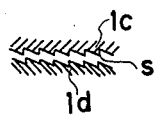
Figure 4A:
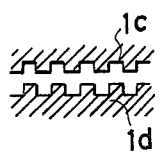
FIG. 4A through FIG. 4D are explanation drawings of several modifications of the engagement portions.
Figure 4B:
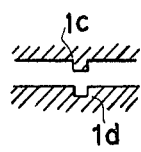
Figure 4C:
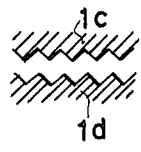
Figure 4D:
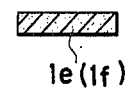

As to the engaging manner between the intermediary member 1d and the engage face 1c, in addition to a manner as shown in FIG. 3 in which the intermediary member 1d and the engage face 1c both are formed with steps of saw teeth-like configuration, there are proposed several manners as shown in FIG. 4, i.e., a manner wherein both are formed with continuous projections (FIG. 4a), a manner wherein they are formed with intermittent projections and depressions, respectively (FIG. 4b), a manner wherein they are formed with teeth of a simply tapered configuration (FIG. 4c), a manner wherein they both are provided with a friction plate 1e, 1f, respectively, made of buff material, for example, and the like.

Figure 5:
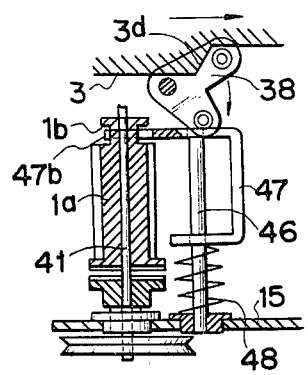
FIG. 5 shows a partially sectioned side view of a modification of the operational structure of FIG. 2.
Figure 6:
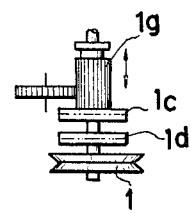
FIG. 6 shows a side view of a modification of a rotor of the clutch system.

As to the up-and-down operation of the lift member 47, without forming the cam portion 49 in the lift member 47 itself, the following manner may be adopted. That is, the switching operation can alternatively be carried out by an operating member 38 like a bell crank pivotally supported at its central portion by an operating portion 3d which is formed on the rack element 3, as shown in FIG. 5. Further, the engage rotor 1a, which is a worm as shown in FIGS. 1-4, can be replaced with a simple gear 1g having a sufficient axial length, as shown in FIG. 6.

Next, the automatic loading structure in the above embodiments according to the present invention will be described in detail, referring to the drawings of FIGS. 7-11.

The flywheels 11 are provided each with a capstan 11a inserted into the central bore thereof. Adjacent to each capstan 11a, there is provided a pinch roller 13a in order to secure a close contact of the tape extending between the reels of the tape pack 50, as is well-known. These pinch rollers 13a are rotatably mounted on a pivotal end of a pinch roller casing 13 which is pivotally mounted at its base portion on a head plate 12. As shown in FIG. 7 for one pinch roller casing 13, between the pinch roller casings 13 is provided a tension spring 16 for pushing out the pivotal ends of the pinch roller casings 13 where the pinch rollers 13a are mounted toward the capstan 11a. Therefore, the tape is closely fitted between the capstan 11a and the pinch roller 13a, not to fail in travelling at a predetermined speed in accordance with the rotation of the capstan 11a.

The pinch roller casings 13 are each is formed, at its pivotal end, with a projection 13b which is inserted into a respective one of engage bores 12b formed in the head plate 12 of the deck 15.

The head plate 12 has an opened box-like configuration, as shown in FIG. 7, in which the capstans 11a and reel bases 27 are arranged. The head plate 12 is slidably mounted on the deck 15 by means of guide pins 15c and rollers 15d. Further, the head plate 12 is pulled by tension springs 25, 25 fitted on both sides thereof in such a direction as to draw a head 12a, integrally formed in an intermediate portion thereof, out of the tape pack 50 mounted on the deck 15.

Figure 8:
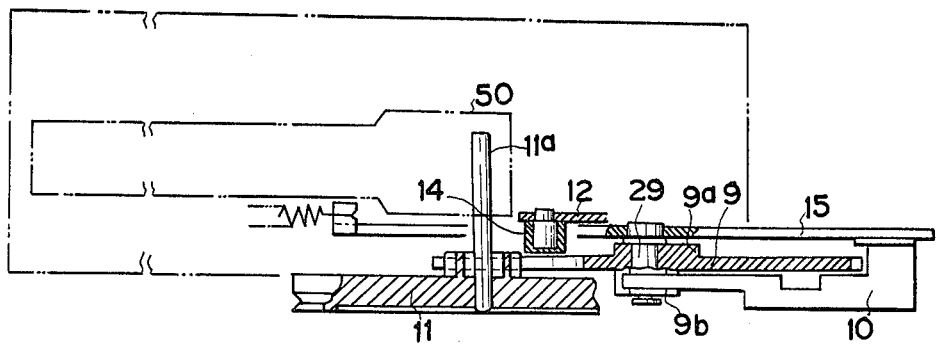
FIG. 8 shows a side view as seen from the direction of the arrow VIII in FIG. 7.
Figure 9:
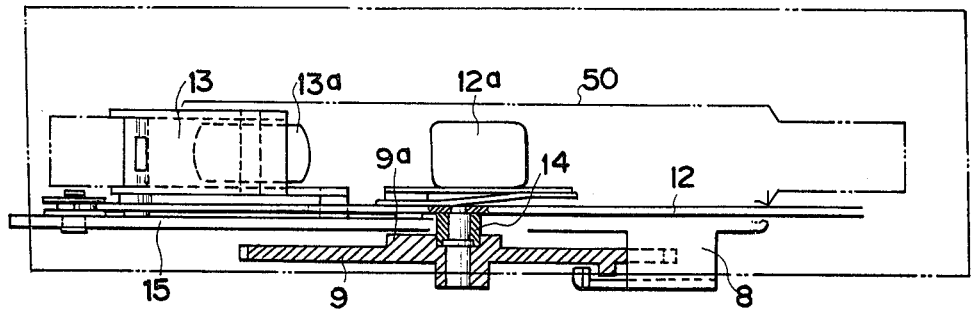
FIG. 9 shows a side view as seen from the direction of the arrow IX in FIG. 7.

The head plate 12 is also provided with a roller 14 at the bottom thereof, as shown in FIG. 8 and FIG. 9, which roller 14 is arranged to come into contact with a cam portion 9a integrally formed with a gear 9, the circumference of which is partially cut off, as at 9D. The gear 9 is pivotally mounted on the deck 15 by a support member 29, as shown in FIG. 8, which gear 9 is arranged to come into engagement with an engage wheel 11b mounted on the common capstan 11a to one of the flywheels 11.

With this arrangement, when the engage wheel 11b is positioned in one of cut portions 9d, as shown in FIG. 7, it disengages from the gear 9. On the other hand, in accordance with the rotation of the gear 9, the engage wheel 11b comes into engagement with the gear 9 to thereby rotate the gear 9 and its cam portion 9a.

In order to carry out engagement and disengagement between the cut portions 9d and the engage wheel 11b as well as to normally keep the engage wheel 11b free from engagement with teeth of the gear 9, a boss 9b as a change member is integrally formed with the gear 9 and the cam portion 9a in a projecting manner, as shown in FIG. 8. The boss 9b is arranged to contact at its plane portion 9b' an end of a resilient plate 10 mounted on the deck 15. Thus, the engagement between the cut portions 9d and the engage wheel 11b is kept released.

On the other hand, a projection 8e of a wheel lock plate 8 joins with a projection 9e formed at the bottom of the gear 9 to thereby rotate the gear 9 in the anticlockwise direction in FIG. 1 with operation of the wheel lock plate 8. Thus, the teeth of the gear 9 come into engagement with the engage wheel 11b, whereby the rotation of the flywheel 11 is transmitted to the gear 9.

The head plate 12 has a projecting portion 12b at one side thereof which is formed with an engage cut 12c, as shown in FIG. 7. In this engage cut 12c is positioned a pin 17a of a lock plate 17 slidably mounted on the deck 15. On the lock plate 17, an end of a spring 20 is connected and in addition, an attractable member 18 is mounted. The attractable member 18 is provided with an electro-magnetic means 19 for keeping the lock plate 17 at its lock position.

Figure 10:
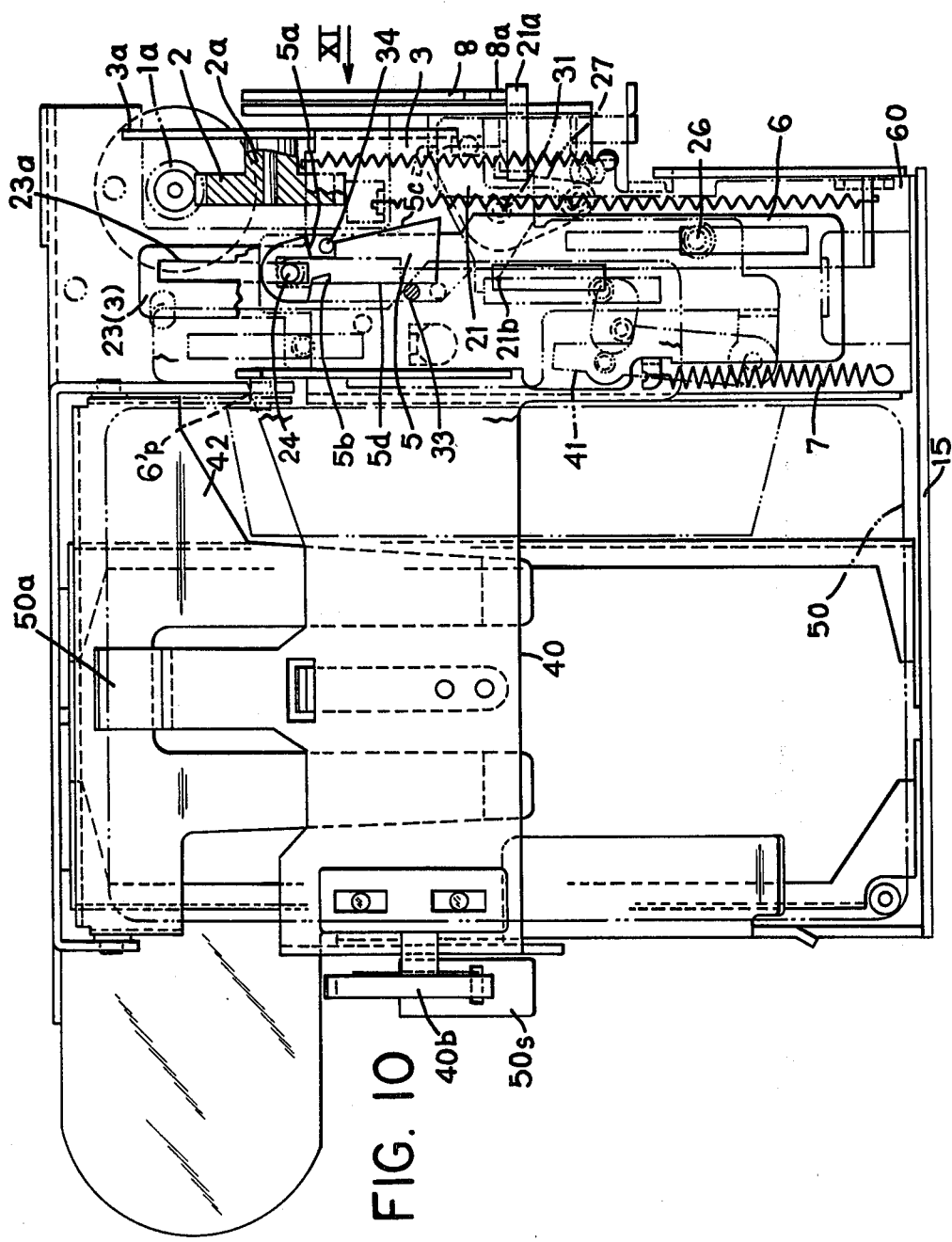
FIG. 10 is a partially sectioned bottom view of the parts around the eject plate and the engage plate of the tape player; and, FIG. 11 shows a side view as seen from the direction of the arrow XI in FIG. 10.

A slide member 40 is arranged to slide engaging with the end 50a of the tape pack 50 upon insertion of the tape pack 50 (FIG. 10). The slide member 40 is formed with an operating portion 40b at an end thereof to thereby switch on switch 50s when it is inserted to a predetermined extent, thus energizing the motor 30. Incidentally, the rack element 3 is integrally actuated by means of a member 41 which causes the engagement of the rack 3.

The rack portion 3a projecting on one end of the rack element 3 engages with a gear portion 2a integrally formed with the linkage rotor 2 rotated by the motor 30, as mentioned above. Further, with the rotation of the motor 30, the intermediate rotor 1 is rotated, as previously mentioned. The engage rotor 1a which is arranged to be in the previously described relation with the intermediate rotor 1 engages with the linkage rotor 2. Therefore, when the rack element 3 is further pushed forward to thereby push the slide member 40 to the utmost end, as shown in FIG. 10, a drop frame 42 provided in the utmost end of the deck 15 is actuated to drop down the tape pack 50 into a playing position. The linkage rotor 2 as well as the gear portion 2a is mounted on a shaft mounted on the deck 15, as shown in FIG. 10 and FIG. 11.

Figure 11:
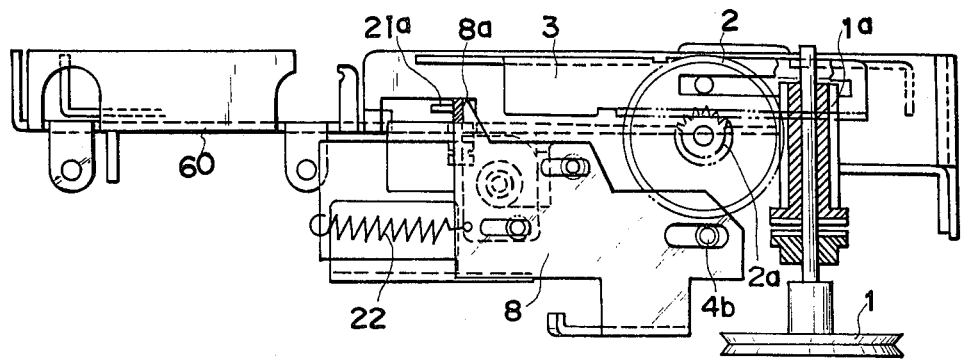

A spring 22 is provided between the wheel lock plate 8 and the deck 15 to urge the wheel lock plate 8 to the left in FIG. 11. The wheel lock plate 8 is formed with a projection 8a in a front end thereof, adjacent to which a projection 21a of an off-plate 21 pivotally supported by a support axis 31 is disposed, as shown in FIG. 10. The off-plate opportunely comes into engagement with a power lock plate 27 which is supported by the same support member 31.

An engage plate 5 and an eject plate 6 are provided adjacent to the rack element 3. The engage plate 5 is pivotally supported by a pin 24 and is formed with cut portions 5a, 5b at both ends thereof and engage sides 5c, 5d, each of the latter having a predetermined angle. Adjacent to the side 5c and the cut portion 5a is disposed a stopper 34 mounted on the rack element 3, and adjacent to the side 5d and the cut portion 5b is provided a stopper 33 of the eject plate 6.

That is, in FIG. 10 where the rack element 3 is sufficiently inserted, the stopper 34 gets free from the pivotal force of the side 5c by dropping into the cut portion 5a. Therefore, the stopper 33, which has been engaged with the cut portion 5b, gets free from engagement, thus to allow the spring 7 to pull the eject plate out. On the other hand, when the eject plate is pushed in to be thereby locked by making the stopper 33 engage with the cut portion 5b, the rack element which has been locked gets free from engagement. Therefore, the rack element 3 is caused to return by another spring for returning the rack element 3.

The operation of the structure as shown in FIGS. 7-11 is now described hereunder.

Upon insertion of the tape pack 50, the motor 30 begins driving to thereby rotate the intermediate rotor 1, the engage rotor 1a and the linkage rotor 2, causing the rack element 3 to slide. Accordingly, upon completing the insertion of the tape pack 50, the clutch switching as mentioned above is carried out to thereby release the eject plate 6 having been locked by the engage plate 5. Then, by operating the off-plate 21 and the wheel lock plate 8 at the end of the return of the eject plate 6, the projection 8e acts on the projection 9e of the gear 9 as shown in FIG. 9 to thereby make the gear engage with the engage rotor 11b. Thus, the gear 9 continues to rotate with the rotation of the flywheels 11, and therefore, the cam portion 9a acts on the roller 14 of the head plate 12 to thereby push the head plate 12 toward the tape pack 50.

At the time when the head 12a of the head plate 12 is properly pushed in (when the cam portion 9a has finished its one full rotation), the pin 17a of the lock plate 17 is inserted into the engage cut 12c of the head plate 12. Therefore, the attractable member 18 is attracted by the electro-magnetic means 19 thus to lock the head plate 12 at its utmost position.

When a power source switch 50s turns on upon insertion of the tape pack 50 to thereby drive the motor 30, the rack element 3 is pushed forward, resulting in the automatic loading operation. Accordingly, upon completing the automatic loading operation, the cam actuating portion 35 stops pushing the lift member 47, thus to attain switching operation for releasing the engagement of the linkage rotor 2 and the intermediate rotor 1.

Therefore, it is possible to change into the tape play condition with a preferable timing by opportunely catching the completion time of the automatic loading operation.

Thus, according to the present invention, it is possible to provide a tape player utilizing a motor for both purposes which is compact in size and simple in handling.

We claim:

1. A cassette tape playing apparatus, comprising: receiving means for receiving a cassette inserted in said tape playing apparatus; a drive motor; first coupling means for operatively coupling said drive motor to a cassette in said receiving means to effect movement of a tape in the cassette; a tape head supported for movement relative to said receiving means between a first position spaced from a cassette therein and a second position engaging the tape in a cassette therein; first and second rotors supported for rotation independently of each other about a common axis and supported for relative axial movement between a third position in which said rotors are spaced from each other and a fourth position in which said rotors are located adjacent each other; second coupling means for drivingly coupling said drive motor to said first rotor; cooperating means on said first and second rotors for releasably locking them against relative rotation in said fourth position thereof; an operating member supported for movement between a fifth position and a sixth position; second coupling means operatively coupling said operating member and said tape head for effecting movement of said tape head from said first position to said second position in response to movement of said operating member from said fifth position to said sixth position; first actuating means responsive to said operating member for placing said first and second rotors in said fourth position when said operating member is in said fifth position and in said third position when said operating member is in said sixth position; second actuating means operatively coupling said second rotor to said operating member for effecting movement of said operating member from said fifth position to said sixth position in response to rotation of said second rotor; and switch means for actuating said drive motor in response to insertion of a cassette into said receiving means; whereby when said tape head, said rotors and said operating member are in said first, fourth, and fifth positions, respectively, and a cassette is inserted in said receiving means, said switch means actuates said driving motor which in turn effects rotation of said first and second rotors, causing said operating member to move from said fifth position to said sixth position and to move tape head from said first to said second position, said first actuating means moving said rotors to said third position when said operating member is moved to said sixth position, thereby disengaging said second rotor from said first rotor and drive motor.

2. The apparatus of claim 1, wherein said first actuating means includes a circumferential groove provided in said second rotor, a switching member supported for movement substantially parallel to said axis of said second rotor between seventh and eighth positions and having a portion which is slidingly received in said circumferential groove, movement of said switching member between said seventh and eighth positions effecting movement of said second rotor relative to said first rotor between said third and fourth positions, respectively, resilient means cooperable with said switching member for yieldably urging it toward said seventh position, and cam means provided on said operating member for maintaining said switching member in said eighth position against the urging of said resilient means in all positions of said operating member except said sixth position.

3. The apparatus of claim 2, wherein said cam means includes a cam surface provided on said operating member and a member which is pivotally supported near said switching member and operatively engages said cam surface and said switching member.

4. The apparatus of claim 2, wherein said cam means includes a cam surface on said operating member which slidably engages said switching member.

5. The apparatus of claim 2, including a stationary pin spaced radially from and extending substantially parallel to said common axis of said rotors, said switching member being slidably supported on said pin for movement therealong and said resilient means being a helical spring which encircles said pin, has one end supported on said switching member, and has the other end supported on a part which is fixed against axial movement relative to said pin.

6. The apparatus of claim 1, wherein said second actuating means includes a rack provided on said operating member and extending therealong substantially in the direction of movement thereof, includes said second rotor having gear teeth thereon, and includes a rotatably supported gear which operatively engages said rack and said gear teeth on said second rotor.

7. The apparatus of claim 6, wherein said second rotor is a worm gear, said gear teeth on said second rotor being part of said worm gear.

8. A clutch arrangement in a tape player which includes a tape driving motor and an automatic loading mechanism, comprising a first rotor supported for rotation about a first axis and rotationally driven by said tape driving motor; a second rotor supported for rotation about said first axis independent of said first rotor and supported for movement relative to said first rotor in a direction lengthwise of said first axis, said second rotor having a peripheral groove therein and said first and second rotors having opposed end faces having drivingly engageable portions which couple said rotors for rotation in unison with each other when said rotors are in a position in which said end faces engage each other; an elongate support bar disposed parallel to said first axis; a switching member supported on said support bar for sliding movement lengthwise thereof and having a portion received in said groove in said second rotor so that movement of said switching member on said support bar moves said second rotor relative to said first rotor between respective positions in which the engageable portions thereon are engaged and disengaged; a spring for urging said switching member to said position in which said second rotor is disengaged from said first rotor; a movably supported rack element having a cam-shaped operating portion; means for effecting movement of said rack element in response to rotation of said second rotor; a pivotally supported operating member disposed between and cooperable with said cam-shaped operating portion of said rack element and said switching member, movement of said rack element causing said operating member to pivot, which in turn causes said switching member to move said second rotor out of engagement with said first rotor.

* * * * *

UNITED STATES PATENT AND TRADEMARK OFFICE
CERTIFICATE OF CORRECTION

PATENT NO. : 4 423 445

DATED : December 27, 1983

INVENTOR(S) : Hitoshi Okada et al

It is certified that error appears in the above-identified patent and that said Letters Patent is hereby corrected as shown below:

Col. 6, line 15; change "second" to ---third---.

line 37; after "move" and before "tape" insert ---said---.

Col. 8, line 19; after "rotor;" insert "and".

Signed and Sealed this

Twenty-fourth Day of July 1984

[SEAL]

Attest:

GERALD J. MOSSINGHOFF

Attesting Officer

Commissioner of Patents and Trademarks